United States Patent
Lim (10) Patent No.: US 7,865,645 B2
(45) Date of Patent: Jan. 4, 2011

(54) BUS ARBITER, BUS DEVICE AND SYSTEM FOR GRANTING SUCCESSIVE REQUESTS BY A MASTER WITHOUT REARBITRATION

(75) Inventor: Eui-Cheol Lim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 55 days.

(21) Appl. No.: 12/437,339

(22) Filed: May 7, 2009

(65) Prior Publication Data

US 2009/0287869 A1    Nov. 19, 2009

(30) Foreign Application Priority Data

May 14, 2008   (KR) .............................. 2008-44503

(51) Int. Cl.
*G06F 13/14*   (2006.01)
(52) U.S. Cl. ................... 710/113; 710/110; 710/118; 710/309
(58) Field of Classification Search ........... 710/107, 710/110, 112, 113, 116, 118, 309
See application file for complete search history.

(56) References Cited

U.S. PATENT DOCUMENTS

| 5,440,698 A | * | 8/1995 | Sindhu et al. ............ 709/225 |
| 5,941,967 A | * | 8/1999 | Zulian .................... 710/107 |
| 2003/0088751 A1 | * | 5/2003 | Wu et al. ................ 711/167 |
| 2008/0147944 A1 | * | 6/2008 | Sonntag et al. .......... 710/240 |

FOREIGN PATENT DOCUMENTS

| JP | 2000-315188 | 11/2000 |
| JP | 2001-175589 | 6/2001 |

OTHER PUBLICATIONS

English Abstract for Publication No. 2000-315188.
English Abstract for Publication No. 2001-175589.

\* cited by examiner

*Primary Examiner*—Glenn A Auve
(74) *Attorney, Agent, or Firm*—F. Chau & Associates, LLC (57) ABSTRACT

A bus arbiter includes an arbitration stop determining unit and a transaction arbitrating unit. The arbitration stop determining unit generates an arbitration stop signal based upon transaction grouping request signals which indicate whether successive transactions are requested. The transaction arbitrating unit selectively performs an arbitration operation based upon the arbitration stop signal.

19 Claims, 7 Drawing Sheets

BUS ARBITER, BUS DEVICE AND SYSTEM FOR GRANTING SUCCESSIVE REQUESTS BY A MASTER WITHOUT REARBITRATION

CROSS-REFERENCE TO RELATED APPLICATION

This application claims priority to and the benefit of Korean Patent Application No. 2008-44503, filed on May 14, 2008 in the Korean Intellectual Property Office (KIPO), the entire content of which is incorporated by reference herein.

BACKGROUND

1. Technical Field

The present disclosure relates to bus arbitration, and more particularly to a bus arbiter, a bus device and a system that implements the bus arbitration.

2. Discussion of the Related Art

A bus arbiter performs bus arbitration between multiple master devices connected to a bus. Each master device outputs a request signal to the bus arbiter. The request signal indicates a request to use the bus. The bus arbiter receives the request signal from the master device, and outputs a grant signal to the master device in a predetermined order. The grant signal indicates a grant for the use of the bus. The master device receiving the grant signal transfers a transaction through the bus to a slave device.

If the multiple master devices simultaneously request the use of the bus, transactions that are successively requested by a single master device may not be successively transferred to the slave device. When the transactions of the master device are not successively transferred, the data processing speed of the slave device may be reduced. In particular, if the slave device is a memory device, the page hit rate of the memory device may be reduced. Even if the master device successively requests transactions for reading or writing data corresponding to adjacent addresses on the same memory page, a transaction of another master device may be inserted between the transactions of the master device, and thus the memory device may receive transactions for reading or writing data on different memory pages. Accordingly, the page hit rate and the data processing speed of the memory device may be reduced. Further, since the data processing speed of the entire system depends upon the data processing speed of the memory device, system performance may be impacted when transactions are not successively transferred to the memory device.

SUMMARY

According to an exemplary embodiment a bus arbiter is provided which groups transactions.

According to an exemplary embodiment a bus device is provided which includes the bus arbiter which groups transactions.

According to an exemplary embodiment a system is provided which includes the bus device which groups transactions.

According to an exemplary embodiment a bus arbiter includes an arbitration stop determining unit coupled to a plurality of master devices. The arbitration stop determining unit is configured to receive transaction grouping request signals from the master devices. Each of the transaction grouping request signals indicate whether a corresponding master device is requesting successive transactions. The arbitration stop determining unit is also configured to generate an arbitration stop signal based upon the transaction grouping request signals. A transaction arbitrating unit is coupled to the master devices. The transaction arbitrating unit is configured to receive transactions from the master devices, to perform an arbitration operation on the transactions corresponding to the arbitration stop signal, and to generate an arbitration result signal based upon whether the arbitration operation is performed.

The arbitration stop determining unit may include an OR gate configured to generate the arbitration stop signal by performing an OR operation on the transaction grouping request signals.

The arbitration stop determining unit may include a selection circuit configured to select a transaction grouping request signal from the transaction grouping request signals as the arbitration stop signal in response to the arbitration result signal, and a delay unit configured to delay the arbitration stop signal.

A master device may transmit a transaction grouping request signal having a first logic level when the master device requests the successive transactions.

The successive transactions may be transactions for reading or writing data on the same memory page.

The transaction arbitrating unit may perform the arbitration operation when the arbitration stop signal has a second logic level and may not perform the arbitration operation when the arbitration stop signal has a first logic level.

The bus arbiter may further include a mode setting unit that receive a mode set signal, the mode setting unit being configured to maintain the arbitration stop signal at a second logic level in response to the mode set signal.

The mode setting unit may include a register configured to store the mode set signal, and an AND gate configured to perform an AND operation on the stored mode set signal and the arbitration stop signal.

The bus arbiter may further include an urgent determining unit coupled to the master devices, the urgent determining unit being configured to maintain the arbitration stop signal at a second logic level when at least one of the plurality of transactions is an urgent transaction.

The urgent determining unit may include an urgent determiner configured to store priorities of the master devices and to determine whether at least one of the transactions is the urgent transaction based upon stored priorities, and an AND gate configured to perform an AND operation on a result of the determination and the arbitration stop signal.

According to an exemplary embodiment a bus device is provided that includes a bus arbiter coupled to a plurality of master devices. The bus arbiter is configured to receive a plurality of transactions and transaction grouping request signals from the master devices, each of the transaction grouping request signals indicating whether a corresponding master device requests successive transactions. The bus arbiter is also configured to selectively perform an arbitration operation on the transactions based upon the transaction grouping request signals, and to generate an arbitration result signal based upon whether the arbitration operation is performed. A routing unit is coupled to the plurality of master devices and at least one slave device, the routing unit being configured to receive the arbitration result signal from the bus arbiter and to transfer one of the transactions to the at least one slave device based upon the arbitration result signal.

According to an exemplary embodiment a system is provided which includes a plurality of master devices configured to generate transactions and transaction grouping request signals, and at least one slave device. Each of the transaction grouping request signals indicate whether a corresponding master device requests successive transactions. A first bus device is coupled to the master devices and to the at least one slave device, the first bus device being configured to receive the transactions and the transaction grouping request signals from the master devices, to selectively perform an arbitration operation on the transactions based upon the transaction grouping request signals, and to transfer one of the transactions to the at least one slave device based upon whether the arbitration operation is performed.

The at least one slave device may include a memory device.

The system may further include a second bus device coupled between the first bus device and the at least one slave device, the second bus device being further coupled to at least one master device. The second bus device is configured to receive transactions from the at least one master device and the first bus device and to transfer one of the transactions from the at least one master device and the first bus device to the at least one slave device.

The first bus device may generate an arbitration stop signal based upon the transaction grouping request signals. The at least one master device may generate at least one transaction grouping request signal. The second bus device may selectively perform an arbitration operation on transactions received from the at least one master device and the first bus device based upon the arbitration stop signal and the at least one transaction grouping request signal.

According to an exemplary embodiment a method of processing transactions from master devices to a slave device over a communications bus is provided. Transactions and transaction grouping request signals are received from at least one master device. An arbitration stop signal is generated based upon the transaction grouping request signals. A determination is made as to whether the arbitration stop signal has a first logic level or a second logic level. If the arbitration stop signal has the first logic level, an arbitration operation is not performed on the transactions and generating an arbitration result signal based upon a result of a previously-performed arbitration operation. If the arbitration stop signal has the second logic level, an arbitration operation is performed on the transactions and the arbitration result signal is generated based upon a result of the arbitration operation. A transaction of the transactions is transferred to the slave device in response to the arbitration result signal.

Generating an arbitration stop signal may further include establishing a logic level of the arbitration stop signal based upon logic levels of the transaction grouping request signals.

Successive transactions from a master device may be grouped such that an access pattern to the slave device that receives the successive transactions is maintained.

The arbitration operation may be performed in a fixed priority manner or in a round-robin manner.

According to an exemplary embodiment a bus arbiter is provided for processing transactions from master devices to a slave device over a communications bus. A arbitration stop determining unit generates an arbitration stop signal based upon transaction grouping request signals that indicate whether successive transactions are requested. A transaction arbitrating unit, coupled to the arbitration stop determining unit, selectively performs an arbitration operation on the transactions based upon the arbitration stop signal.

According to an exemplary embodiment, transactions of a master device are grouped and the grouped transactions are transferred to a slave device, thereby improving a system performance. Further, according to an exemplary embodiment, a memory access pattern of a master device is maintained, thereby improving a page hit rate of a memory device and a data processing speed of the entire system.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EXEMPLARY EMBODIMENTS

Various exemplary embodiments will be described more fully hereinafter with reference to the accompanying drawings. Exemplary embodiment of the present invention may take many different forms and should not be construed as limited to the exemplary embodiments set forth herein. Like numerals refer to like elements throughout.

It will be understood that when an element is referred to as being "connected" or "coupled" to another element, it can be directly connected or coupled to the other element or intervening elements may be present.

Figure 1:
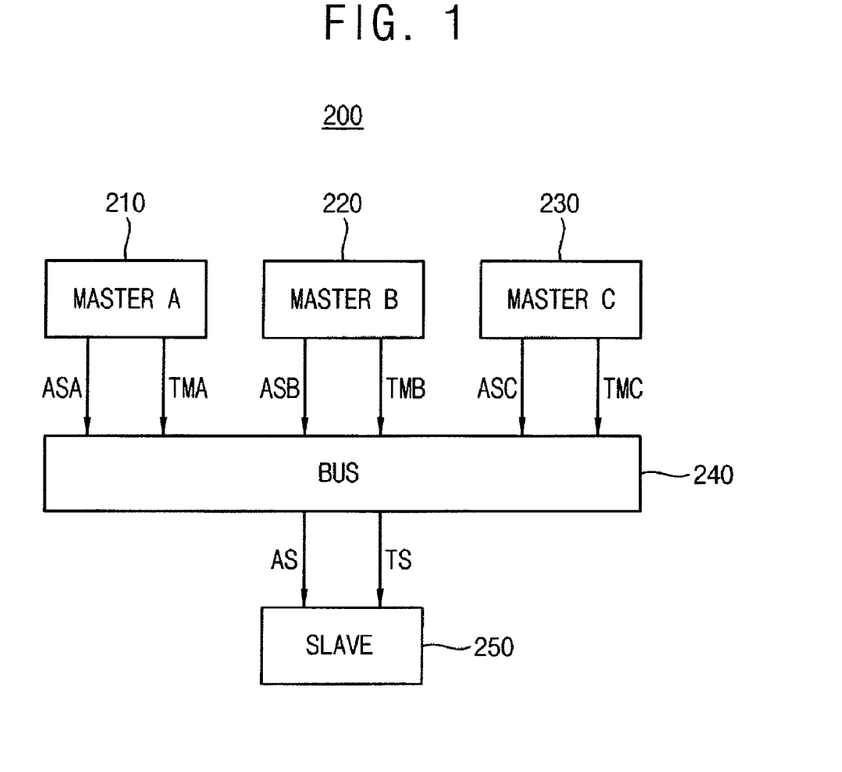
FIG. 1 is a block diagram illustrating a system according to an exemplary embodiment of the present invention.

FIG. 1 is a block diagram illustrating a system according to an exemplary embodiment. The system 200 includes a first master A device 210, a second master B device 220, a third master C device 230, a bus device 240 and a slave device 250. While the system 200 illustrated in FIG. 1 includes three master devices and one slave device, the system 200 may include one or more master devices and one or more slave devices.

The first master A device 210 transmits a first transaction TMA and a first transaction grouping request signal ASA to the bus device 240 so that the first transaction TMA is transferred to the slave device 250. The first transaction grouping request signal ASA has a first logic level (e.g., a logic high level) when the first master A device 210 requests successive transactions. In an exemplary embodiment, the slave device 250 is a memory device, and the successive transactions are transactions involving data on the same memory page. The second master B device 220 transmits a second transaction TMB and a second transaction grouping request signal ASB to the bus device 240. The third master C device 230 transmits a third transaction TMC and a third transaction grouping request signal ASC to the bus device 240. The second transaction grouping request signal ASB has the first logic level when the second master B device 220 requests successive transactions involving data on the same memory page, and the third transaction grouping request signal ASC has the first logic level when the second master C device 230 requests successive transactions involving data on the same memory page.

The bus device 240 receives the transactions TMA, TMB, TMC and the transaction grouping request signals ASA, ASB, ASC from the master devices 210, 220, 230. The bus device 240 generates an arbitration stop signal AS based upon the transaction grouping request signals ASA, ASB, ASC. The bus device 240 selectively performs an arbitration operation on the transactions TMA, TMB, TMC corresponding to the arbitration stop signal AS.

For example, when the bus device 240 simultaneously receives the first transaction TMA, the second transaction TMB and the third transaction TMC, and the bus device 240 receives the transaction grouping request signals ASA, ASB, ASC each of which has a second logic level, the bus device 240 generates the arbitration stop signal AS having the second logic level. The bus device 240 performs the arbitration operation corresponding to the arbitration stop signal AS having the second logic level such that one of the first transaction TMA, the second transaction TMB and the third transaction TMC is transferred to the slave device 250. In an exemplary embodiment, the arbitration operation is performed in a fixed priority manner or in a round-robin manner. When at least one of the first transaction grouping request signal ASA, the second transaction grouping request signal ASB and the third transaction grouping request signal ASC has the first logic level, the bus device 240 generates the arbitration stop signal AS having the first logic level, and does not perform the arbitration operation. For example, when the first master A device 210 transmits the successive transactions and the first transaction grouping request signal ASA having the first logic level to the bus device 240, the bus device 240 does not perform the arbitration operation and continuously transfers the first transaction TMA to the slave device 250.

The slave device 250 receives one transaction TS of the first transaction TMA, the second transaction TMB and the third transaction TMC from the bus device 240, and performs an operation corresponding to the received transaction TS. The slave device 250 may further receive the arbitration stop signal AS generated based upon the first transaction grouping request signal ASA, the second transaction grouping request signal ASB and the third transaction grouping request signal ASC. In an exemplary embodiment, the slave device is a memory device, a memory controller, or another bus device. In an exemplary embodiment, if the slave device 250 is another bus device distinct from the bus device 240, the arbitration stop signal AS is a transaction grouping request signal transmitted to the bus device.

In an exemplary embodiment, if the slave device 250 is the memory device, each of the master devices 210, 220, 230 transmits the transaction grouping request signal ASA, ASB, ASC having the first logic level when each of the master devices 210, 220, 230 transmits the successive transactions involving data on the same memory page. Accordingly, the successive transactions are grouped and the grouped transactions are transferred to the memory device. Among the grouped transactions, another transaction is not inserted, and the grouped transactions are successively transferred to the slave device 250. The successive transactions are maintained to have an access pattern to the memory device. The data on the same memory page may be data on memory cells included in the same row of the memory device. If the memory device receives the successive transactions involving data on the same memory page, the memory device does not perform a precharge operation and a row access operation and performs only a column access operation on an active row since the data requested by the successive transactions is stored in a sense amplifier. Accordingly, the memory access latency of the memory device is reduced, and the operational speed of the memory device increases.

The bus device 240 selectively performs the arbitration operation based upon the transaction grouping request signals ASA, ASB, ASC, and thus the memory device receives the grouped transactions. Accordingly, the page hit rate of the memory device increases, and the utilization of the memory device is increased. Thus, the operational speed and a performance of the entire system 200 increases.

Figure 2:
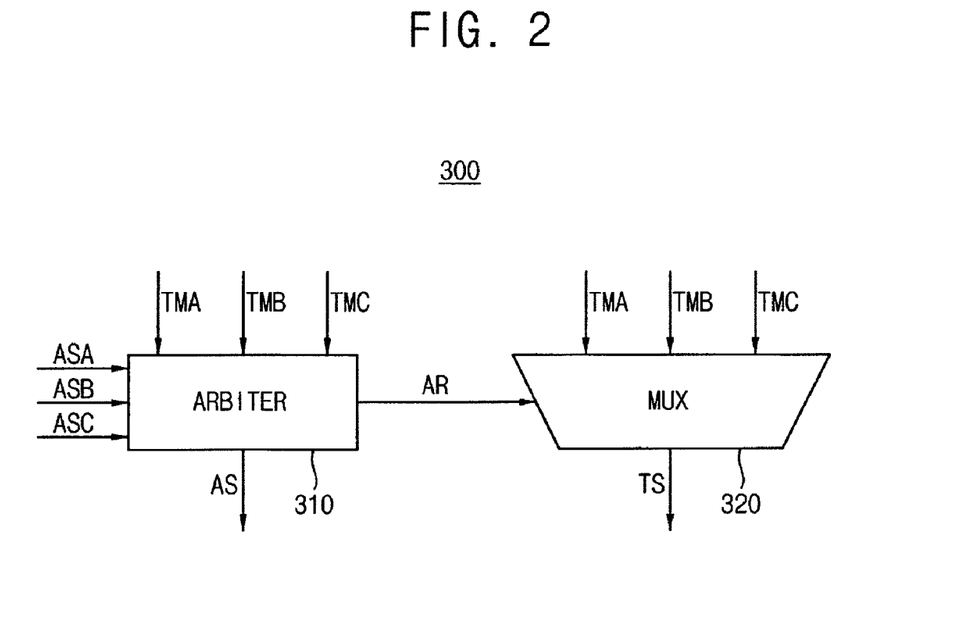
FIG. 2 is a block diagram illustrating an exemplary embodiment of a bus device included in the system of FIG. 1.

FIG. 2 is a block diagram illustrating an exemplary embodiment of a bus device included in the system of FIG. 1. The bus device 300 includes a bus arbiter 310 and a routing unit 320.

The bus arbiter 310 receives the transactions TMA, TMB, TMC and the transaction grouping request signals ASA, ASB, ASC from the master devices 210, 220, 230 illustrated in FIG. 1. Each of the transaction grouping request signals ASA, ASB, ASC indicates whether the corresponding master device 210, 220, 230 desires to transmit successive transactions. For example, the first transaction grouping request signal ASA has the first logic level when the first master A device 210 requests the successive transactions. The successive transactions may be transactions involving data on the same memory page.

The bus arbiter 310 generates the arbitration stop signal AS based upon the transaction grouping request signals ASA, ASB, ASC. A logic level of the arbitration stop signal AS is determined based upon the logic levels of the transaction grouping request signals ASA, ASB, ASC. In an exemplary embodiment, the arbitration stop signal AS has the first logic level (e.g., a logic high level) when at least one of the transaction grouping request signals ASA, ASB, ASC has the first logic level. In other embodiments, the arbitration stop signal AS has the first logic level when a transaction grouping request signal of a master device that has transmitted a transaction previously transferred to the slave device 250 has the first logic level. That is, the logic level of the arbitration stop signal AS is the same as the logic level of the transaction grouping request signal transmitted from the master device previously occupying the bus device 300. The arbitration stop signal AS is transmitted to the slave device 250 illustrated in FIG. 1. The arbitration stop signal AS may be transmitted to another bus device as a transaction grouping request signal.

The bus arbiter 310 selectively performs the arbitration operation on the transactions TMA, TMB, TMC corresponding to the arbitration stop signal AS. For example, when the arbitration stop signal AS has the first logic level, the bus arbiter 310 does not perform the arbitration operation. When the arbitration stop signal AS has the second logic level, the bus arbiter 310 performs the arbitration operation. The bus arbiter 310 may perform the arbitration operation in a fixed priority manner or in a round-robin manner.

The bus arbiter 310 generates an arbitration result signal AR based upon whether the arbitration operation is performed, and transmits the arbitration result signal AR to the routing unit 320. For example, when the arbitration operation is not performed, the bus arbiter 310 transmits the arbitration result signal AR that is the same as an arbitration result signal previously transmitted to the routing unit 320. When the arbitration operation is performed, the bus arbiter 310 transmits the arbitration result signal AR corresponding to the result of the arbitration operation.

The routing unit 320 receives the arbitration result signal AR from the bus arbiter 310, and transfers one transaction TS of the transactions TMA, TMB, TMC to the slave device 250 illustrated in FIG. 1 in response to the arbitration result signal AR. The routing unit 320 includes a multiplexer for selecting the transaction TS from the transactions TMA, TMB, TMC in response to the arbitration result signal AR. The routing unit 320 may include one or more multiplexers and/or one or more de-multiplexers (or decoders).

Figure 3:
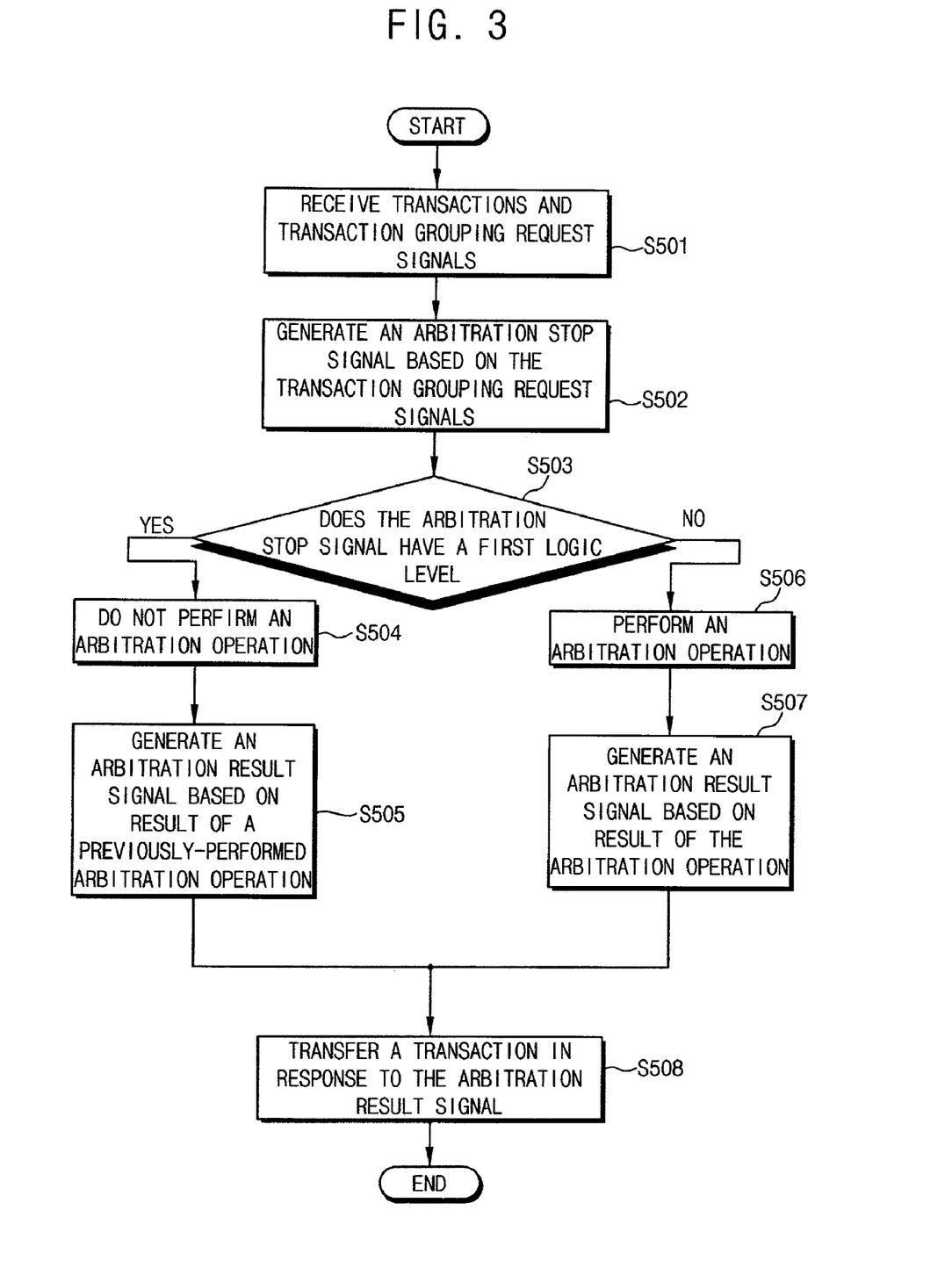
FIG. 3 is a flow chart illustrating operations of the bus device of FIG. 2.

FIG. 3 is a flow chart illustrating an exemplary operation of the bus device of FIG. 2. Referring to FIGS. 2 and 3, the bus device 300 receives the transactions TMA, TMB, TMC and the transaction grouping request signals ASA, ASB, ASC from the master devices 210, 220, 230 (step S501). The bus arbiter 310 generates the arbitration stop signal AS based upon the transaction grouping request signals ASA, ASB, ASC (step S502). The logic level of the arbitration stop signal AS may be determined based upon the logic levels of the transaction grouping request signals ASA, ASB, ASC.

If the arbitration stop signal AS has the first logic level (step S503: YES), the bus arbiter 310 does not perform the arbitration operation on the transactions TMA, TMB, TMC (step S504). The bus arbiter 310 generates the arbitration result signal AR based upon the result of a previously-performed arbitration operation (step S505). That is, the bus arbiter 310 generates the arbitration result signal AR having a logic level that is the same as a logic level of an arbitration result signal previously transmitted to the routing unit 320.

If the arbitration stop signal AS has the second logic level (step S503: NO), the bus arbiter 310 performs the arbitration operation on the transactions TMA, TMB, TMC (step S506). The arbitration operation may be performed in a fixed priority manner or in a round-robin manner. The bus arbiter 310 generates the arbitration result signal AR based upon the result of the arbitration operation (step S507).

The routing unit 320 receives the arbitration result signal AR from the bus arbiter 310, and transfers one transaction TS of the transactions TMA, TMB, TMC in response to the arbitration result signal AR. The successive transactions are grouped and transferred to the slave device 250 such that the access pattern to the slave device 250 is maintained. Accordingly, the operational speed of the slave device 250 increases. In the case where the slave device 250 is the memory device, the page hit rate of the memory device increases, thereby increasing the performance of the memory device and the entire system.

Figure 4:
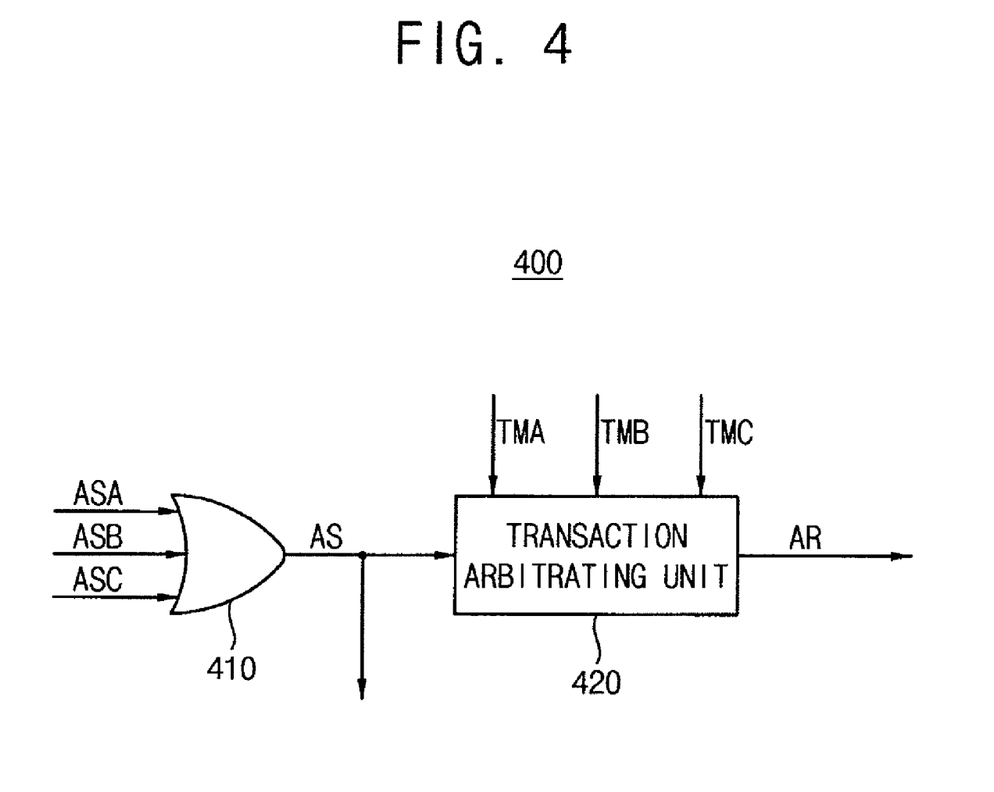
FIG. 4 is a block diagram illustrating an exemplary embodiment of a bus arbiter included in the bus device of the FIG. 2.

FIG. 4 is a block diagram illustrating an exemplary embodiment of a bus arbiter included in the bus device of the FIG. 2. The bus arbiter 400 includes an arbitration stop determining unit 410 and a transaction arbitrating unit 420.

The arbitration stop determining unit 410 receives the transaction grouping request signals ASA, ASB, ASC from the master devices 210, 220, 230 illustrated in FIG. 1. The transaction grouping request signals ASA, ASB, ASC indicate whether the master devices 210, 220, 230 are requesting successive transactions, respectively.

The arbitration stop determining unit 410 generates the arbitration stop signal AS based upon the transaction grouping request signals ASA, ASB, ASC. For example, the arbitration stop signal AS may have the first logic level when at least one of the transaction grouping request signals ASA, ASB, ASC has the first logic level. In an exemplary embodiment, the arbitration stop determining unit 410 includes an OR gate for performing an OR operation on the transaction grouping request signals ASA, ASB, ASC. The arbitration stop signal AS is transferred to the slave device 250 illustrated in FIG. 2 or to another bus device.

The transaction arbitrating unit 420 receives the transactions TMA, TMB, TMC from the master devices 210, 220, 230 illustrated in FIG. 1, and receives the arbitration stop signal AS from the arbitration stop determining unit 410. The transaction arbitrating unit 420 selectively performs the arbitration operation based upon the arbitration stop signal AS. For example, when the arbitration stop signal AS has the first logic level, the transaction arbitrating unit 420 does not perform the arbitration operation. When the arbitration stop signal AS has the second logic level, the transaction arbitrating unit 420 performs the arbitration operation.

The transaction arbitrating unit 420 generates the arbitration result signal AR based upon whether the arbitration operation is performed. For example, if the arbitration stop signal AS has the first logic level, the transaction arbitrating unit 420 does not perform the arbitration operation, and generates the arbitration result signal AR that is the same as a previously-generated arbitration result signal AR. If the arbitration stop signal AS has the second logic level, the transaction arbitrating unit 420 performs the arbitration operation, and generate the arbitration result signal AR corresponding to the result of the arbitration operation.

Figure 5:
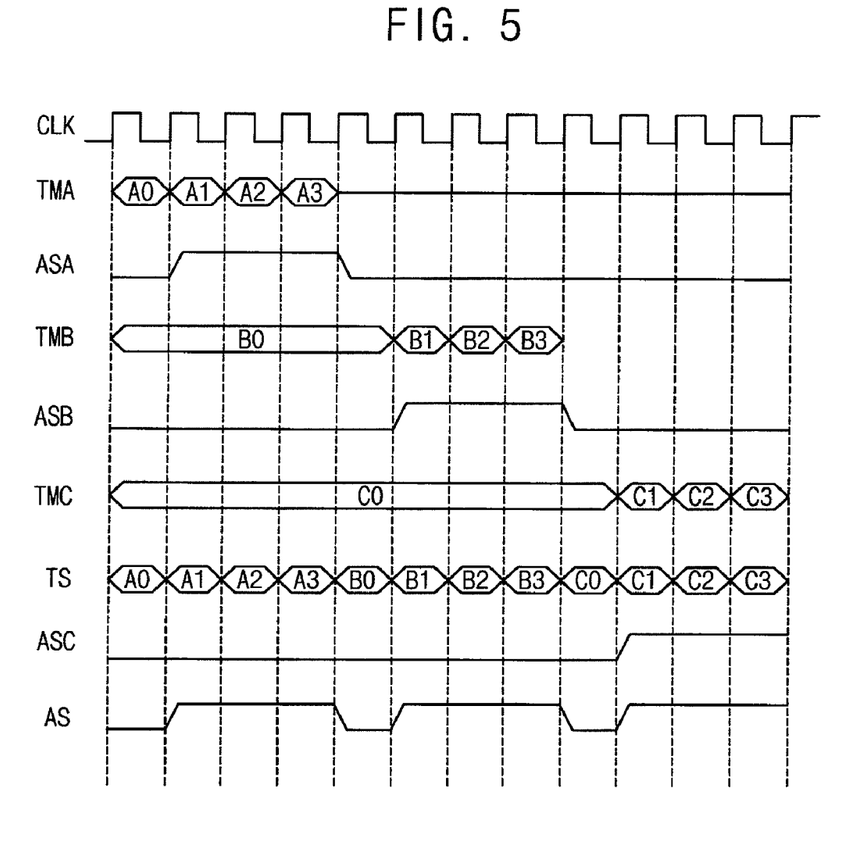
FIG. 5 is a timing diagram illustrating transactions, transaction grouping request signals and an arbitration stop signal in the system of FIG. 1 which includes the bus arbiter of FIG. 4.

FIG. 5 is a timing diagram illustrating transactions, transaction grouping request signals and an arbitration stop signal in the system of FIG. 1 including the bus arbiter of FIG. 4. In FIG. 5, CLK represents a clock signal applied to the bus arbiter 400. Hereinafter, the operation of the bus arbiter 400 of FIG. 4 will be described with reference to FIGS. 1, 4 and 5.

During a first cycle of the clock signal CLK, the arbitration stop determining unit 410 receives the transaction grouping request signals ASA, ASB, ASC having the second logic levels from the master devices 210, 220, 230, and generates the arbitration stop signal AS having the second logic level. The transaction arbitrating unit 420 receives transactions A0, B0, C0 from the master devices 210, 220, 230, and performs the arbitration operation. According to the arbitration operation, the transaction A0 is transferred to the slave device 250.

During a second cycle of the clock signal CLK, the first master A device 210 transmits the first transaction grouping request signal ASA having the first logic level. The arbitration stop determining unit 410 generates the arbitration stop signal AS having the first logic level. The transaction arbitrating unit 420 does not perform the arbitration operation corresponding to the arbitration stop signal AS. The transaction arbitrating unit 420 generates the arbitration result signal AR that is the same as the previously-generated arbitration result signal AR, or the arbitration result signal AR generated during the first cycle of the clock signal CLK. The routing unit 250 illustrated in FIG. 2 transfers a transaction A1 of the first master A device 210 that transmits the previously-transferred transaction A0.

During a third cycle and a fourth cycle of the clock signal CLK, the arbitration stop determining unit 410 generates the arbitration stop signal AS having the first logic level. Transactions A2, A3 transmitted from the first master A device 210 are transferred to the slave device 250. Thus, the successive transactions A0, A1, A2, A3 requested by the first master A 210 device are grouped and transferred to the slave device 250 in succession. Accordingly, the operational speed of the slave device 250 increases. Further, if the slave device 250 is a memory device, the page hit rate and the memory utilization increases, thereby increasing the performance of the memory device and the entire system.

During a fifth cycle of the clock signal CLK, the transaction grouping request signals ASA, ASB, ASC have the second logic levels, the arbitration stop determining unit 410 generates the arbitration stop signal AS having the second logic level. The transaction arbitrating unit 420 performs the arbitration operation on transactions B0, C0. According to the arbitration operation, the transaction B0 is transferred to the slave device 250. During a sixth cycle through an eighth cycle of the clock signal CLK, the second transaction grouping request signal ASB has the first logic level, transactions B1, B2, B2 of the second master B device 220 are transferred in succession. During a ninth cycle through a twelfth cycle of the clock signal CLK, transactions C0, C1, C2, C3 are grouped and transferred in succession.

As illustrated in FIG. 5, the transactions B0, B1, B2, B3 of the second master B device 220 are transferred in succession, immediately after the transactions A0, A1, A2, A3 of the first master A device 210 are transferred. In a conventional system using a locked transfer method, after a result of a transaction is transferred from a slave device to a master device occupying a bus device, another master device may occupy the bus device. However, in the system 200, even though the transactions A0, A1, A2, A3 of the first master A device 210 are not completed in the slave device 250, the transactions B0, B1, B2, B3 of the second master B device 220 are transferred to the slave device 250. Accordingly, the bandwidth of the bus device 240 is efficiently utilized.

Figure 6:
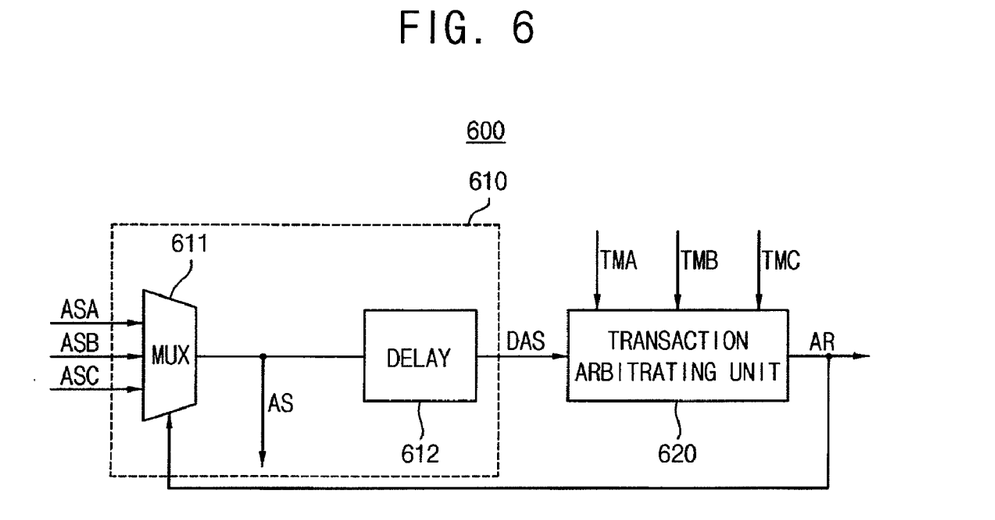
FIG. 6 is a block diagram illustrating another exemplary embodiment of a bus arbiter included in the bus device of the FIG. 2.

FIG. 6 is a block diagram illustrating an exemplary embodiment of a bus arbiter which may be alternatively included in the bus device of the FIG. 2. The bus arbiter 600 includes an arbitration stop determining unit 610 and a transaction arbitrating unit 620.

The arbitration stop determining unit 610 includes a selection circuit 611 and a delay unit 612. The selection circuit 611 receives the transaction grouping request signals ASA, ASB, ASC. The selection circuit 611 receives the arbitration result signal AR that is fedback from the transaction arbitrating unit 620, and selects one transaction grouping request signal of the transaction grouping request signals ASA, ASB, ASC as the arbitration stop signal AS in response to the arbitration result signal AR. Accordingly, the selection circuit 611 generates the arbitration stop signal AS by selecting the transaction grouping request signal of a master device transmitting a transaction to be transferred. In an exemplary embodiment, the selection circuit 611 includes a multiplexer. The delay unit 612 generates a delayed arbitration stop signal DAS by delaying the arbitration stop signal AS by one cycle.

The transaction arbitrating unit 620 selectively performs the arbitration operation on the transactions TMA, TMB, TMC based upon the delayed arbitration stop signal DAS. The transaction arbitrating unit 620 generates the arbitration result signal AR based upon whether the arbitration operation is performed.

For example, if the arbitration result signal AR indicates that a transaction of the first master A device 210 is to be transferred, the selection circuit 611 selects the first transaction grouping request signal ASA as the arbitration stop signal AS. When the first transaction grouping request signal ASA has the first logic level, the arbitration stop signal AS has the first logic level, and the delayed arbitration stop signal DAS has the first logic level after one cycle elapses. The transaction arbitrating unit 620 does not perform the arbitration operation, and generates the arbitration result signal AR indicating that a transaction of the first master A device 210 is to be transferred. Accordingly, successive transactions of the first master A device 210 are grouped and transferred to the slave device 250 in succession.

Figure 7:
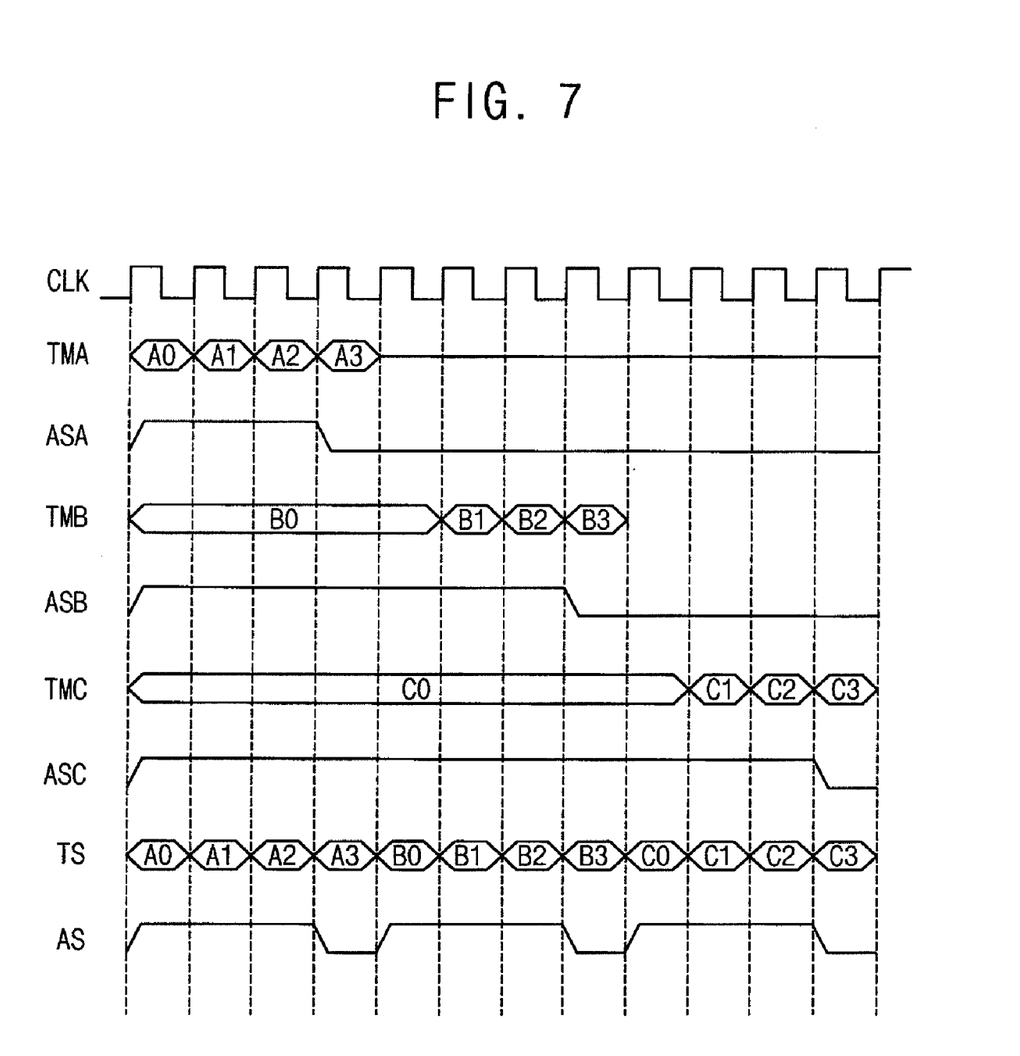
FIG. 7 is a timing diagram illustrating transactions, transaction grouping request signals and an arbitration stop signal in the system of FIG. 1 including the bus arbiter of FIG. 6.

FIG. 7 is a timing diagram illustrating transactions, transaction grouping request signals and an arbitration stop signal in the system of FIG. 1 including the bus arbiter of FIG. 6. In FIG. 7, CLK represents a clock signal applied to the bus arbiter 600. Hereinafter, the operation of the bus arbiter 600 of FIG. 6 will be described in more detail with reference to FIGS. 1, 6 and 7.

During a first cycle of the clock signal CLK, the transaction arbitrating unit 620 receives the delayed arbitration stop signal DAS having the second logic level if there is no transaction previously transferred. The transaction arbitrating unit 620 performs the arbitration operation, and generates the arbitration result signal AR corresponding to a transaction A0 of the first master A device 210. The transaction A0 of the first master A device 210 is transferred to the slave device 250. The selection circuit 611 receives the arbitration result signal AR as a selection signal, and generates the arbitration stop signal AS having the first logic level by selecting the first transaction grouping request signal ASA.

During a second cycle and a third cycle of the clock signal CLK, the delay unit 612 outputs the delayed arbitration stop signal DAS having the first logic level to the transaction arbitrating unit 620. The transaction arbitrating unit 620 does not perform the arbitration operation in response to the delayed arbitration stop signal DAS, and generates the arbitration result signal AR that is the same as a previously-generated arbitration result signal, or the arbitration result signal AR generated during the first cycle of the clock signal CLK. The routing unit 250 illustrated in FIG. 2 transfers transactions A1, A2 of the first master A device 210 that transmits the previously-transferred transaction A0. The selection circuit 611 receives the arbitration result signal AR as the selection signal, and generates the arbitration stop signal AS having the first logic level by selecting the first transaction grouping request signal ASA.

During a fourth cycle of the clock signal CLK, the delay unit 612 outputs the delayed arbitration stop signal DAS having the first logic level to the transaction arbitrating unit 620. The transaction arbitrating unit 620 does not perform the arbitration operation in response to the delayed arbitration stop signal DAS, and generates the arbitration result signal AR that is the same as the previously-generated arbitration result signal, or the arbitration result signal AR generated during the third cycle of the clock signal CLK. Accordingly, the successive transactions A0, A1, A2, A3 are grouped and transferred to the slave device 250 in succession. The selection circuit 611 receives the arbitration result signal AR as the selection signal, and generates the arbitration stop signal AS having the second logic level by selecting the first transaction grouping request signal ASA.

During a fifth cycle of the clock signal CLK, the delay unit 612 generates the delayed arbitration stop signal DAS having the second logic level. The transaction arbitrating unit 620 performs the arbitration operation on transactions B0, C0 in response to the delayed arbitration stop signal DAS. According to the result of the arbitration operation, the transaction B0 of the second master device is transferred. During the fifth cycle through an eighth cycle of the clock signal CLK, transactions B0, B1, B2, B3 are grouped and transferred to the slave device 250 in succession. During a ninth cycle through a twelfth cycle of the clock signal CLK, transactions C0, C1, C2, C3 are grouped and transferred to the slave device 250 in succession. Accordingly, the operational speed of the slave device 250 increases, the bandwidth of the bus device 240 may be efficiently utilized and the performance of the entire system increases.

Figure 8:
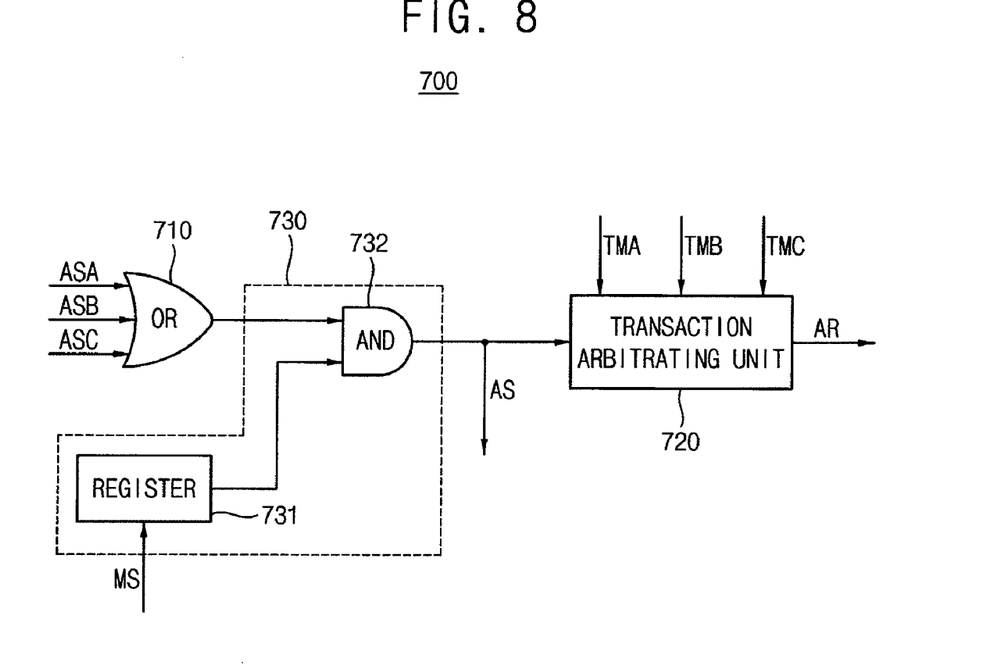
FIG. 8 is a block diagram illustrating an exemplary embodiment of a bus arbiter included in the bus device of the FIG. 2.

FIG. 8 is a block diagram illustrating an exemplary embodiment of a bus arbiter which may be alternatively included in the bus device of the FIG. 2. The bus arbiter 700 includes an arbitration stop determining unit 710, a transaction arbitrating unit 720 and a mode setting unit 730. The bus arbiter 700 also includes a transaction arbitrating unit 720 which is similar to the bus arbiter 400 of FIG. 4.

The mode setting unit 730 receives a mode set signal MS from an external device (not shown), and maintains the arbitration stop signal AS at the second logic level based upon the mode set signal MS. For example, when the mode setting unit 730 receives the mode set signal MS having the second logic level, the mode setting unit 730 maintains the arbitration stop signal AS at the second logic level. Accordingly, the transaction arbitrating unit 720 performs the arbitration operation on the transactions TMA, TMB, TMC regardless of the transaction grouping request signals ASA, ASB, ASC.

In an exemplary embodiment, the mode setting unit 730 includes a register 731 and an AND gate 732. The register 731 receives the mode set signal MS and stores the mode set signal MS. The register 731 provides the stored mode set signal MS to the AND gate 732 until the register 731 receives another mode set signal MS from the external device. The AND gate 732 generates the arbitration stop signal AS by performing an AND operation on the mode set signal MS from the register 731 and an output signal of the arbitration stop determining unit 710. Accordingly, the arbitration stop signal AS is maintained at the second logic level in response to the mode set signal MS. For example, the second logic level of the mode set signal MS indicates a signal arbitration mode. In the signal arbitration mode, the transaction arbitrating unit 720 performs the arbitration operation on the transactions TMA, TMB, TMC regardless of the transaction grouping request signals ASA, ASB, ASC.

Figure 9:
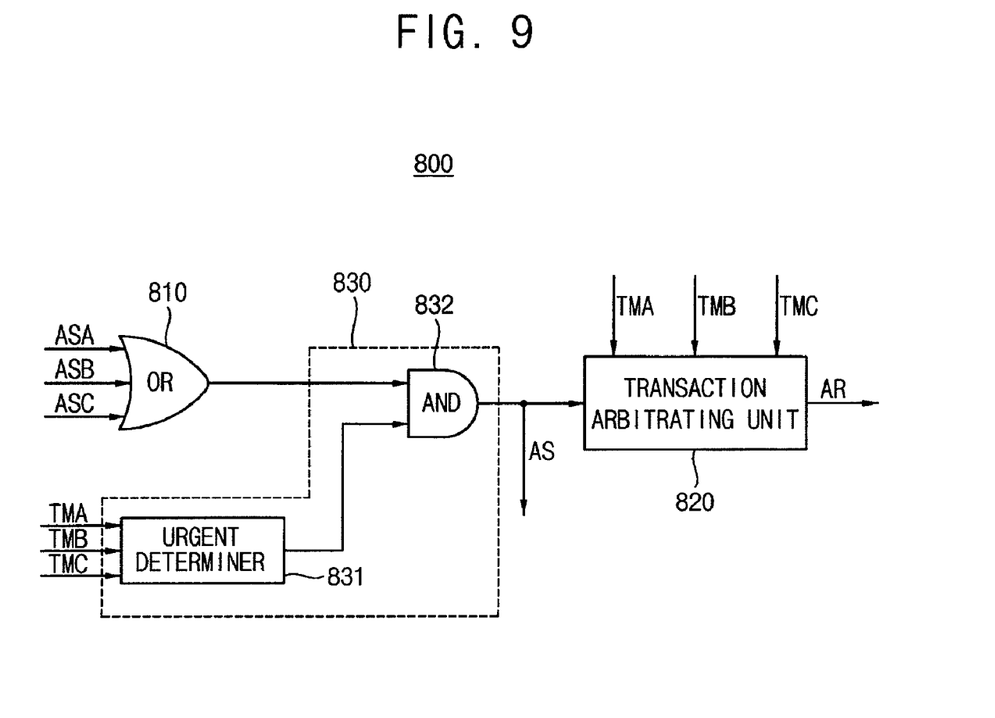
FIG. 9 is a block diagram illustrating an exemplary embodiment of a bus arbiter included in the bus device of the FIG. 2.

FIG. 9 is a block diagram illustrating an exemplary embodiment of a bus arbiter which may be alternatively included in the bus device of the FIG. 2. The bus arbiter 800 includes an arbitration stop determining unit 810, a transaction arbitrating unit 820 and an urgent determining unit 830. The bus arbiter 800 further includes the urgent determining unit 830 with respect to the bus arbiter 400 of FIG. 4.

The urgent determining unit 830 receives the transactions TMA, TMB, TMC from the master devices 210, 220, 230 illustrated in FIG. 1. The urgent determining unit 830 maintains the arbitration stop signal AS at the second logic level when at least one of the transactions TMA, TMB, TMC is an urgent transaction. Accordingly, the transaction arbitrating unit 820 performs the arbitration operation on the transactions TMA, TMB, TMC regardless of the transaction grouping request signals ASA, ASB, ASC.

In an exemplary embodiment, the urgent determining unit 830 includes an urgent determiner 831 and an AND gate 832. The urgent determiner 831 receives the transactions TMA, TMB, TMC and extracts priority information from the transactions TMA, TMB, TMC. In an exemplary embodiment, the priority information is determined according to the master devices 210, 220, 230, and the priority information is stored in the urgent determining unit 830. The urgent determiner 831 determines an existence of the urgent transaction based upon the stored priority information or based upon the extracted priority information from the transactions TMA, TMB, TMC. When the urgent determiner 831 determines that the urgent transaction exists, the urgent determiner 831 outputs a signal having the second logic level. The AND gate 832 generates the arbitration stop signal AS by performing an AND operation on the output signal of the urgent determiner 831 and the output signal of the arbitration stop determining unit 810. Accordingly, the urgent determining unit 830 maintains the arbitration stop signal AS at the second logic level, and the transaction arbitrating unit 720 performs the arbitration operation on the transactions TMA, TMB, TMC regardless of the transaction grouping request signals ASA, ASB, ASC.

Figure 10:
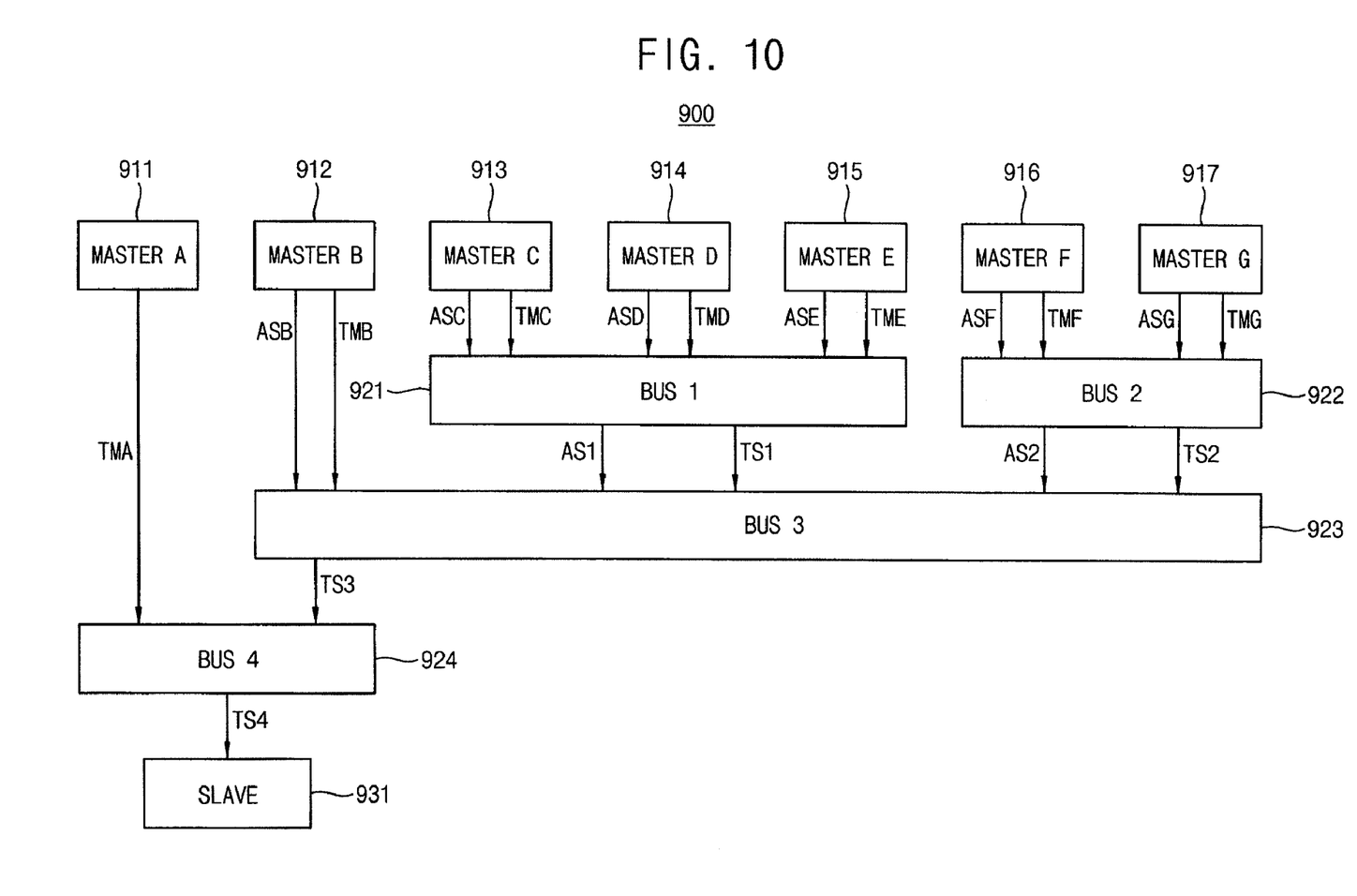
FIG. 10 is a block diagram illustrating a system according to an exemplary embodiment.

FIG. 10 is a block diagram illustrating a system according to an exemplary embodiment. The system 900 includes a plurality of master devices 911, 912, 913, 914, 915, 916, 917, a plurality of bus devices 921, 922, 923, 924 and a slave device 931.

A first bus 1 device 921 is coupled to a third master C device 913, a fourth master D device 914 and a fifth master E device 915 and a third bus 3 device 923. A second bus 2 device 922 is coupled to a sixth master F device 916, a seventh master G device 917 and the third bus 3 device 923. The third bus 3 device 923 is coupled to a second master B device 912, the first bus 1 device 921, the second bus 2 device 922 and a fourth bus 4 device 924. The fourth bus 4 device 924 is coupled to a first master A device 911, the third bus 3 device 923 and the slave device 931. While the system 900 illustrated in FIG. 10 includes seven master devices 911, 912, 913, 914, 915, 916, 917 and one slave device 931, the system 900 may include one or more master devices and one or more slave devices. While the system 900 illustrated in FIG. 10 includes four bus devices 921, 922, 923, 924, the number and connections of the bus devices included in the system 900 may be varied according to the transaction request frequency of each master device or the bandwidth of each bus device.

The first bus 1 device 921 receives transactions TMC, TMD, TME and transaction grouping request signals ASC, ASD, ASE from the second master C device 913, the fourth master D device 914 and the fifth master E device 915. The second bus 2 device 922 receives transactions TMF, TMG and transaction grouping request signals ASF, ASG from the sixth master F device 916 and the seventh master G device 917. For example, second master C device 913, the fourth master D device 914 and the fifth master E device 915 may be a camera interface, a post processing device and a 2D engine, respectively. The sixth master F device 916 and the seventh master G device 917 may be a video processor and a video mixer, respectively. The first bus 1 device 921 generates a first arbitration stop signal AS1 based upon the transaction grouping request signals ASC, ASD, ASE, and selectively performs an arbitration operation on the transactions TMC, TMD, TME corresponding to the first arbitration stop signal AS1. The second bus 2 device 922 generates a second arbitration stop signal AS2 based upon the transaction grouping request signals ASF, ASG and selectively performs an arbitration operation on the transactions TMF, TMG corresponding to the second arbitration stop signal AS2. Accordingly, the first bus 1 device 921 and the second bus 2 device 922 groups and transfers successive transactions requested by each master device 913, 914, 915, 916, 917 to the third bus 3 device 923. The successive transactions transferred to third bus 3 device 923 are maintained to have a pattern. The first arbitration stop signal AS1 and the second arbitration stop signal AS2 are applied to the third bus 3 device 923 as transaction grouping request signals.

The third bus 3 device 923 receives a transaction TMB and a transaction grouping request signal ASB from the second master B device 912, and the third bus device 923 receives transactions TS1, TS2 and transaction grouping request signals AS1, AS2 from the first bus device 921 and the second bus device 922. For example, the second master B device 912 may be a 3D engine. If the second master B device 912 is a device of which transaction latency is critical, the second master B device 912 requests the transaction TMB including priority information that indicates an urgent transaction. When the third bus device 923 receives the urgent transaction from the second master B device 912, the third bus device 923 performs the arbitration operation on the transactions TMB, TS1, TS2 regardless of the transaction grouping request signals ASB, AS1, AS2. In an exemplary embodiment, if the transaction grouping request signal ASB of the second master B device 912 is the first logic level, the third bus device 923 does not perform the arbitration operation and successively transfers the transaction TMB of second master B device 912 to the fourth bus device 924 even though the third bus device 923 receives the urgent transaction from the second master B device 912.

The fourth bus device 924 receives a transaction TMA from the first master A device 911, and receives the transaction TS3 from the third bus device 923. In an exemplary embodiment, the fourth bus device 924 further receives transaction grouping request signals from the first master A device 911 and the third bus device 923. In an exemplary embodiment, the first master A device 911 may be a central processing unit (CPU), and the fourth bus device 924 may be a conventional bus device that does not perform a transaction grouping operation.

The slave device 931 receives one transaction TS4 of transactions TMA, TMB, TMC, TMD, TME, TMF, TMG from the master devices 911, 912, 913, 914, 915, 916, 917, and process the transaction TS4. In an exemplary embodiment, the slave device 931 is a memory device or a memory controller. The slave device 931 receives successive transactions involving data on the same memory page. If the memory device receives the successive transactions involving data on the same memory page, the memory device does not perform a precharge operation and a row access operation and performs only a column access operation on an active row. Accordingly, the memory access latency of the memory device is reduced, and the operational speed of the memory device increases.

As described above, the bus arbiter, the bus device and the system according to an exemplary embodiment groups successive transactions of a master device and transfers the grouped transactions to a slave device. Accordingly, system performance is improved. The bus arbiter, the bus device and the system according to an exemplary embodiment transfers the successive transactions of which a memory access pattern is maintained to a memory device. Accordingly, a page hit rate of the memory device increases and the performance of the memory device and the entire system increases.

The bus arbiter, the bus device and the system according to an exemplary embodiment may be applied to systems using bus arbitration. The bus arbiter, the bus device and the system according to an exemplary embodiment may be applied to an on-chip system using an advanced extensible interface (AXI) protocol or an open core protocol (OCP).

Although practical exemplary embodiments have been described, those skilled in the art will readily appreciate that many modifications are possible. Therefore, it is to be understood that the foregoing is not to be construed as limited to the specific exemplary embodiments disclosed, and that modifications to the disclosed exemplary embodiments, as well as other exemplary embodiments, are also intended to be included within the scope of the appended claims.

What is claimed is:

1. A bus arbiter, comprising:
   an arbitration stop determining unit coupled to a plurality of master devices, the arbitration stop determining unit configured to receive transaction grouping request signals from the master devices, each of the transaction grouping request signals indicating whether a corresponding master device is requesting successive transactions, and configured to generate an arbitration stop signal based upon the transaction grouping request signals; and
   a transaction arbitrating unit coupled to the master devices, the transaction arbitrating unit configured to receive transactions from the master devices, to perform an arbitration operation on the transactions corresponding to the arbitration stop signal, and to generate an arbitration result signal based upon whether the arbitration operation is performed.

2. The bus arbiter of claim 1, wherein the arbitration stop determining unit comprises:
   an OR gate configured to generate the arbitration stop signal by performing an OR operation on the transaction grouping request signals.

3. The bus arbiter of claim 1, wherein the arbitration stop determining unit comprises:
   a selection circuit configured to select a transaction grouping request signal from the transaction grouping request signals as the arbitration stop signal in response to the arbitration result signal; and
   a delay unit configured to delay the arbitration stop signal.

4. The bus arbiter of claim 1, wherein a master device transmits a transaction grouping request signal having a first logic level when the master device requests the successive transactions.

5. The bus arbiter of claim 1, wherein the successive transactions are transactions for reading or writing data on the same memory page.

6. The bus arbiter of claim 1, wherein the transaction arbitrating unit performs the arbitration operation when the arbitration stop signal has a second logic level and does not perform the arbitration operation when the arbitration stop signal has a first logic level.

7. The bus arbiter of claim 1, further comprising:
   a mode setting unit that receives a mode set signal, the mode setting unit configured to maintain the arbitration stop signal at a second logic level in response to the mode set signal.

8. The bus arbiter of claim 7, wherein the mode setting unit comprises:
   a register configured to store the mode set signal; and
   an AND gate configured to perform an AND operation on the stored mode set signal and the arbitration stop signal.

9. The bus arbiter of claim 1, further comprising:
   an urgent determining unit coupled to the master devices, the urgent determining unit configured to maintain the arbitration stop signal at a second logic level when at least one of the plurality of transactions is an urgent transaction.

10. The bus arbiter of claim 9, wherein the urgent determining unit comprises:
    an urgent determiner configured to store priorities of the master devices and to determine whether at least one of the transactions is the urgent transaction based upon stored priorities; and
    an AND gate configured to perform an AND operation on a result of the determination and the arbitration stop signal.

11. A bus device, comprising:
    a bus arbiter coupled to a plurality of master devices, the bus arbiter configured to receive a plurality of transactions and transaction grouping request signals from the master devices, each of the transaction grouping request signals indicating whether a corresponding master device requests successive transactions, and configured to selectively perform an arbitration operation on the transactions based upon the transaction grouping request signals, and to generate an arbitration result signal based upon whether the arbitration operation is performed; and a routing unit coupled to the plurality of master devices and at least one slave device, the routing unit configured to receive the arbitration result signal from the bus arbiter and to transfer one of the transactions to the at least one slave device based upon the arbitration result signal.

12. A system, comprising:

a plurality of master devices configured to generate transactions and transaction grouping request signals, each of the transaction grouping request signals indicating whether a corresponding master device requests successive transactions;

at least one slave device; and a first bus device coupled to the master devices and to the at least one slave device, the first bus device configured to receive the transactions and the transaction grouping request signals from the master devices, to selectively perform an arbitration operation on the transactions based upon the transaction grouping request signals, and to transfer one of the transactions to the at least one slave device based upon whether the arbitration operation is performed.

13. The system of claim 12, wherein the at least one slave device includes a memory device.

14. The system of claim 12, further comprising a second bus device coupled between the first bus device and the at least one slave device, the second bus device further coupled to at least one master device, and configured to receive transactions from the at least one master device and the first bus device and to transfer one of the transactions from the at least one master device and the first bus device to the at least one slave device.

15. The system of claim 14, wherein the first bus device generates an arbitration stop signal based upon the transaction grouping request signals, wherein the at least one master device generates at least one transaction grouping request signal, and wherein the second bus device selectively performs an arbitration operation on transactions received from the at least one master device and the first bus device based upon the arbitration stop signal and the at least one transaction grouping request signal.

16. A method of processing transactions from master devices to a slave device over a communications bus, the method comprising:

receiving the transactions and transaction grouping request signals from at least one master device;

generating an arbitration stop signal based upon the transaction grouping request signals;

determining whether the arbitration stop signal has a first logic level or a second logic level;

if the arbitration stop signal has the first logic level, not performing an arbitration operation on the transactions and generating an arbitration result signal based upon a result of a previously-performed arbitration operation, and if the arbitration stop signal has the second logic level, performing an arbitration operation on the transactions and generating the arbitration result signal based upon a result of the arbitration operation; and transferring to the slave device a transaction of the transactions in response to the arbitration result signal.

17. The method of claim 16, wherein generating an arbitration stop signal further comprises establishing a logic level of the arbitration stop signal based upon logic levels of the transaction grouping request signals.

18. The method of claim 16, further comprising grouping successive transactions from a master device such that an access pattern to the slave device that receives the successive transactions is maintained.

19. The method of claim 16, wherein the arbitration operation is performed in a fixed priority manner or in a round-robin manner.

* * * * *